(No Model.) 2 Sheets—Sheet 2.
H. HOCH.
LAWN OR GARDEN SPRINKLER.
No. 582,017. Patented May 4, 1897.
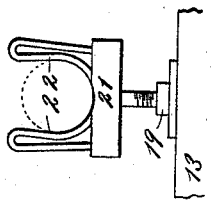
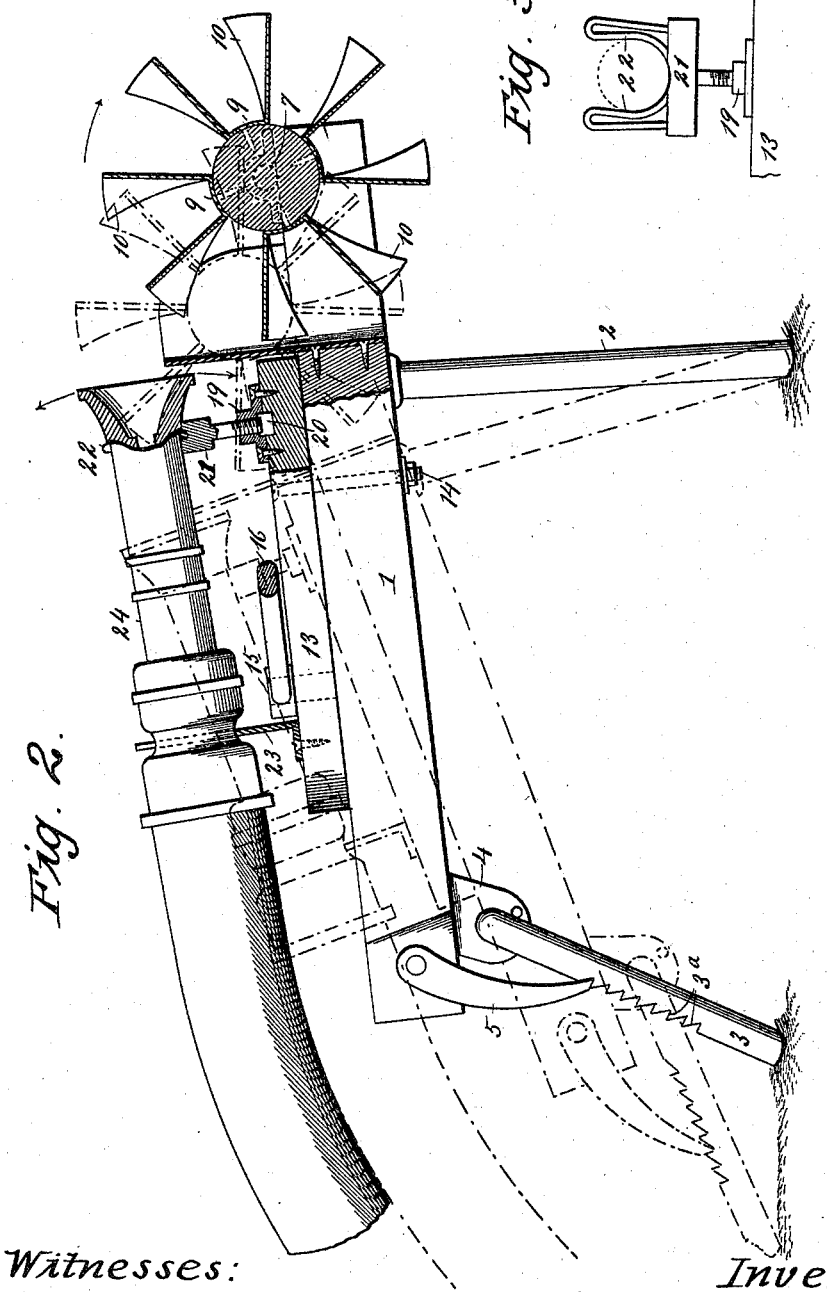
Witnesses:
Inventor:
Homer Hoch
By Higdon & Higdon
Attys.

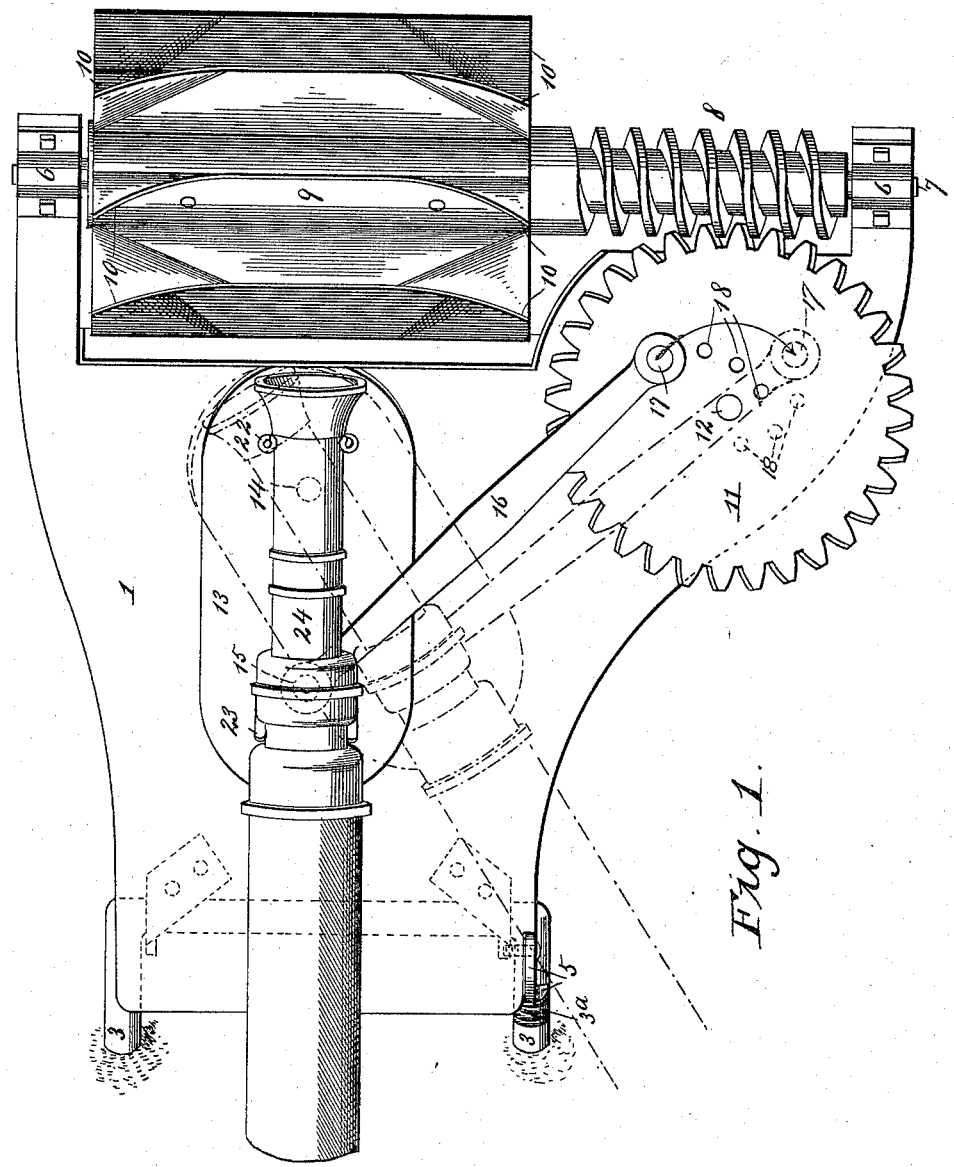

UNITED STATES PATENT OFFICE.

HOMER HOCH, OF MARION, KANSAS.

LAWN OR GARDEN SPRINKLER.

SPECIFICATION forming part of Letters Patent No. 582,017, dated May 4, 1897.

Application filed October 14, 1896. Serial No. 608,839. (No model.)

*To all whom it may concern:*

Be it known that I, HOMER HOCH, of Marion, Marion county, Kansas, have invented certain new and useful Improvements in Lawn and Garden Sprinklers, of which the following is a full, clear, and exact description, reference being had to the accompanying drawings, forming a part thereof.

My invention relates to lawn and garden sprinklers; and it consists in certain novel and peculiar features of construction and combinations of parts, which will be hereinafter described and claimed.

The object of the invention is to produce a sprinkler of this character which performs its work thoroughly and combines simplicity, strength, and durability with cheapness of manufacture.

In order that the invention may be fully understood, I will proceed to describe it with reference to the said accompanying drawings, in which—

Figure 1 is a plan view of a lawn and garden sprinkler embodying my invention. Fig. 2 is a view of the same, partly in side elevation and partly in vertical section. Fig. 3 is a detail view to show the means whereby the distance of throw or reach of the water is regulated.

Like reference-numerals designate corresponding parts in the several views.

1 designates the base or table portion of the device. It is provided at its front end with the supporting-legs 2 and at its rear end with the adjustable supporting-legs 3. The rear supporting-legs are preferably formed by bending a rod to inverted-U shape and journaling it in brackets 4, secured to the under side and rear end of said table. By this means it is obvious that the inclination of the table may be varied—that is, raised or lowered—by properly manipulating said pivoted legs, and in order to secure it at any desired point of adjustment the notches 3ª of one of said legs is engaged by the gravity-pawl 5, carried by said table, as shown clearly. Arranged transversely of the front end of the table and journaled in bearings 6 thereof is a shaft 7. Said shaft for a portion of its length is provided with a worm-thread 8 and between said worm-thread and one of the bearings 6 carries a water-wheel 9, the blades of which are bent at their ends, as shown at 10, and all in the same direction, for a purpose which will hereinafter be made apparent. A worm-wheel 11 is rotatably mounted upon a stub-shaft 12, projecting upwardly from the table, and said wheel meshes with the worm-thread 8.

Arranged upon the table rearward and centrally of the water-wheel is a plate 13, and said plate is pivoted, as at 14, at a point approximately concentric with the curved ends 10 of the water-wheel blades, as they successively occupy a point vertically over the axis of the shaft 7. Said plate, near its rear end, is provided with a pin 15, to which is pivotally connected the link 16, pivotally mounted also at its opposite end upon the pin 17, removably occupying one or another of the openings 18 in the worm-wheel 11 and arranged spirally of its axis. By this arrangement it is obvious that the rotation of the shaft 7 revolves the wheel 11 and thereby swings the rear end of the plate 13 from side to side, and it is equally obvious that the length of such movement of said plate varies accordingly as the pin 17 engages an opening 18 a greater or less distance from its axis. In other words, the width of swath sprinkled is varied by inserting the pin 17 in one or another of the openings 18. Forward of its pivot said plate carries a threaded tap or nut 19, and the opening of said tap or nut preferably registers with a cavity 20 in the upper side of said plate, though it will be understood, of course, that said tap or nut may be of sufficient depth or thickness to accommodate the adjustment hereinbefore referred to without requiring a cavity in said plate.

21 designates a T-shaped bolt, the stem portion of which is threaded and engages the tap or nut 19. The head of said bolt carries an inverted spring yoke or clip 22, which is arranged in longitudinal alinement with a yoke or clip 23, secured to the plate 13 near its rear end, and said yokes or clips are adapted to engage the nozzle 24 of a hose-pipe and support it, as shown clearly in the drawings.

The yoke or clip 23 preferably engages loosely one of the annular grooves formed externally upon the hose-nozzle, while the spring-clip is adapted to engage the nozzle at its front end with a yielding pressure, so as to prevent its accidental dislocation and yet permit it to be placed quickly and easily in position or removed.

In practice the hose-nozzle is arranged relatively to the water-wheel about as shown in the drawings—that is, so that the discharge of water will strike the upper portion of the uppermost blade and thereby cause the wheel to rotate in the direction indicated by the arrow, Fig. 2. The contact of the water with the blades of course causes the former to spread out or assume a sheet-like form without materially diminishing its distance of reach or throw, as it will be observed that the lower part of the stream from the nozzle touches the wheel-blades just enough to turn the wheel and thereby cause the discharge end of the hose to swing back and forth through the medium of the mechanism already described. The force and volume of the water against the blades are regulated by vertically adjusting the yoke-carrying T-bolt 21, as will be readily understood.

This sprinkler will be found especially advantageous in garden-sprinkling, owing to the fact that it can be placed first at the far end of the garden, and as soon as sufficient water is supplied over a given area, which is also subject to regulation, as hereinbefore explained, the sprinkler can be approached from the rear, where the ground is as yet perfectly dry, (as all of the water is discharged in front,) and moved rearwardly to a new position, and this operation can be repeated until the whole garden is well watered without necessitating the attendant wading in mud.

The above mode of operating or handling the sprinkler is applicable also to lawn-sprinkling—that is, the whole lawn may be sprinkled without requiring the attendant to wade in wet grass. It also can be adjusted without turning off the water.

It is obvious from the foregoing that this sprinkler cannot clog, and that it obviates the heavy pressure found in hose provided with the spraying attachments and caused by adjusting the nozzle to discharge only a limited quantity of water.

It is to be understood, of course, that changes in the form, detail, construction, and arrangement may be made without departing from the spirit and scope or sacrificing any of the advantages of my invention.

Having thus described the invention, what I claim as new, and desire to secure by Letters Patent, is—

1. A lawn and garden sprinkler, comprising a suitable support, a shaft journaled therein and provided with a worm-thread, and a water-wheel, a worm-wheel engaging the worm-thread, a swinging plate carrying the nozzle of a hose so that the water discharged will operate said water-wheel, and a link pivotally connecting the worm-wheel and said swinging plate, substantially as described.

2. A lawn and garden sprinkler, comprising a suitable support, a shaft journaled therein and provided with a worm-thread, and a water-wheel having the ends of its blades curved approximately as shown at 10, a worm-wheel engaging the worm-thread, a swinging plate carrying the nozzle of a hose so that the water discharged will operate said water-wheel, and a link pivotally connecting the worm-wheel and said swinging plate, substantially as described.

3. A lawn and garden sprinkler, comprising a suitable table or support, a shaft journaled transversely of its front end, provided with a water-wheel and a worm-thread, a worm-wheel provided with a series of openings arranged spirally with reference to its axis, mounted rotatably upon said table and engaging said worm-thread, a plate pivoted near its front end upon said table and rearward of the center of said water-wheel, hose-nozzle-supporting devices carried by said plate near its rear or free end and its front end, a pin removably engaging one of the openings of said worm-wheel, and a link pivotally connecting said pin with the pivoted plate near its free end, substantially as described.

4. A lawn and garden sprinkler, comprising a table or other suitable support, a shaft journaled at its front end, and provided with a water-wheel and with a worm-thread, a worm-wheel rotatably mounted upon the table and engaging the worm-thread, a plate pivotally mounted upon the table near its front end rearward and centrally of the water-wheel, a link pivotally connecting said plate near its rear end with said worm-wheel, a yoke carried by said plate near its rear end, a nut or tap carried by said plate near its front end, and a spring-yoke, provided with a threaded stem engaging said nut or tap, substantially as described.

5. A lawn and garden sprinkler, comprising a table, adjustable legs supporting its rear end, a shaft journaled transversely of its front end, and provided with a worm-thread and a water-wheel, a worm-wheel engaging the worm-thread, a swinging plate carrying the nozzle of a hose so that the water discharged will operate said water-wheel, and a link pivotally connecting the worm-wheel and said swinging plate, substantially as described.

6. A lawn and garden sprinkler, comprising a table, adjustable legs supporting the rear end of the same, and consisting of an inverted-U-shaped rod pivotally mounted with respect to the table and having one leg notched or toothed, a dog pivotally mounted upon the table and engaging one or another of said notches or teeth, a shaft journaled transversely of the front end of said table, and provided with a worm-thread and a water-wheel, a worm-wheel engaging the worm-thread, a swinging plate carrying the nozzle of a hose so that the water discharged will operate said water-wheel, and a link pivotally connecting the worm-wheel and said swinging plate, substantially as described.

In testimony whereof I affix my signature in presence of two witnesses.

HOMER HOCH.

Witnesses:
 H. M. THORP,
 S. L. BILLINGS.